US012354119B2

(12) United States Patent
Siu

(10) Patent No.: US 12,354,119 B2
(45) Date of Patent: Jul. 8, 2025

(54) NON-FUNGIBLE TOKEN WATERMARKING MANAGEMENT SYSTEM

(71) Applicant: eBay Inc., San Jose, CA (US)

(72) Inventor: Tsun Kwan Donald Siu, Fremont, CA (US)

(73) Assignee: eBay Inc., San Jose, CA (US)

( * ) Notice: Subject to any disclaimer, the term of this patent is extended or adjusted under 35 U.S.C. 154(b) by 383 days.

(21) Appl. No.: 18/148,884

(22) Filed: Dec. 30, 2022

(65) Prior Publication Data

US 2024/0221000 A1    Jul. 4, 2024

(51) Int. Cl.
*G06F 21/16* (2013.01)
*G06Q 30/018* (2023.01)

(52) U.S. Cl.
CPC ......... *G06Q 30/0185* (2013.01); *G06F 21/16* (2013.01)

(58) Field of Classification Search
CPC .............................. G06F 21/16; G06Q 30/0185
USPC ........................................................ 726/26
See application file for complete search history.

(56) References Cited

U.S. PATENT DOCUMENTS

| 2023/0071093 | A1* | 3/2023 | Madhusudhan ... | G06Q 30/0601 |
| 2023/0130182 | A1* | 4/2023 | Mir ........................ | H04L 9/3247 |
| | | | | 713/189 |
| 2023/0162166 | A1* | 5/2023 | Keller .................... | G06Q 20/02 |
| | | | | 705/35 |
| 2024/0119128 | A1* | 4/2024 | Li ........................ | H04L 63/0435 |

* cited by examiner

*Primary Examiner* — Michael S McNally
(74) *Attorney, Agent, or Firm* — Shook, Hardy & Bacon L.L.P.

(57) ABSTRACT

Methods, systems, and computer storage media for providing a smart-contract-based watermarking service. A smart-contract-based watermarking service includes smart contract programming for displaying and removing digital watermarks on NFTs. In operation, a request to execute a watermark-mining operation on a digital asset is accessed. The request comprises a set of digital watermarking request attributes. Based on the set of digital watermarking request attributes, a digital asset and a digital watermark are accessed. The digital asset is minted as a non-fungible token associated with the digital watermark and a smart contract that controls display of the digital watermark associated with the digital asset. A notification is communicated, the notification indicating that the watermark-minting operation has been executed. Based on a request having a set of digital watermarking request attributes that authorize display of the digital asset, the smart contract is used to authorize display of the digital asset without the digital watermark.

20 Claims, 14 Drawing Sheets

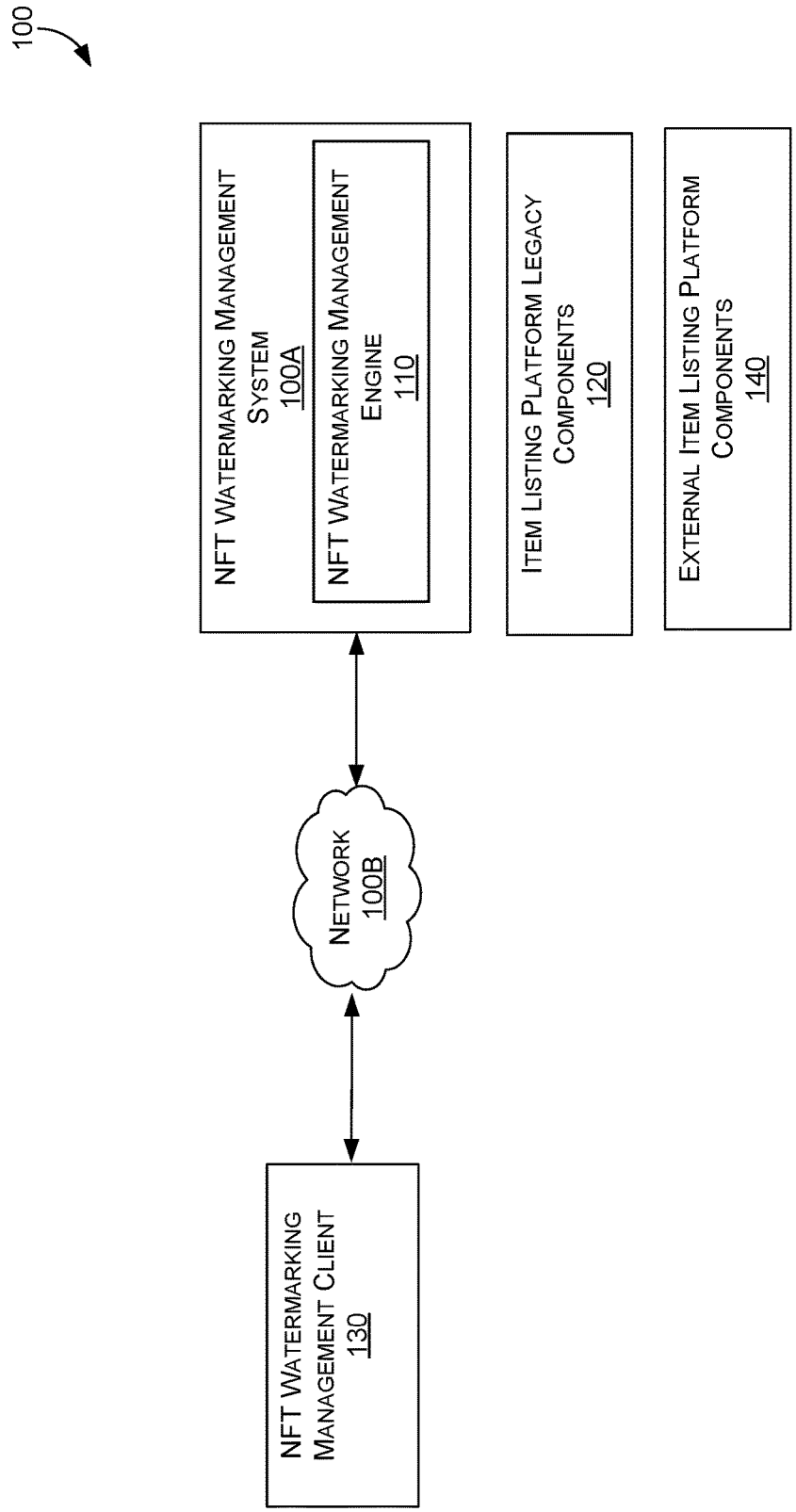

NON-FUNGIBLE TOKEN WATERMARKING MANAGEMENT SYSTEM

BACKGROUND

An item listing platform supports storing items in item databases and providing a search system for receiving queries and identifying search result items based on the queries. An item listing platform may also provide a computing environment with features for managing collectible items. For example, the item listing platform can provide asset management functionality to buy, sell, and trade culturally and historically significant collectible items or assets. The item listing platform can also support items (e.g., assets, physical assets, digital assets or non-fungible tokens—"NFTs") that are maintained using a blockchain system. The blockchain is a type of distributed ledger technology that consists of growing list of records—called blocks—that are securely linked together using cryptography.

Conventionally, item listing platforms are not configured with a comprehensive computing logic and infrastructure to provide blockchain-based digital watermarking for items. In particular, fraud and counterfeiting are challenges that are faced with NFT technology. An NFT digital asset, even if unique on a blockchain can be duplicated and used to mint other NFT digital assets. While an NFT digital asset may still remain unique on the blockchain, other computing-based measures to curb unauthorized copying can address limitations in computing security functionality for NFT digital assets. Illegal duplication of NFT digital assets, if not properly managed, can affect efficient functioning of computing components associated an item listing platform of the NFT digital assets. As such, a comprehensive item listing platform—with an alternative basis for providing NFT digital asset security operations—can improve computing operations and interfaces in the item listing platform.

SUMMARY

Various aspects of the technology described herein are generally directed to systems, methods, and computer storage media for, among other things, providing a smart-contract-based watermarking service. Item listing platforms lack support for non-fungible token (NFT) watermarking functionality for watermarking NFTs. A smart-contract-based watermarking service includes smart contract programming for displaying and removing digital watermarks on NFTs. An item listing platform can operate with a blockchain system to leverage smart contracts to program watermarks into NFTs (e.g., at the time the NFT is minted). The NFT can be caused to be displayed with or without a corresponding watermark based on smart contract programming associated with secrets (e.g., public key and private key).

In operation, a request is received to execute a watermark-minting operation on a digital asset. The request comprises a plurality of digital watermarking request attributes. Based on the digital watermarking request attributes, a digital asset and a digital watermark are accessed. The digital asset is minted as a non-fungible token in combination with the digital watermark and a smart contract that controls display functions associated with the digital watermark. In this way, based on receiving a request to cause display of the digital asset, the digital asset is caused to be displayed based on the display functions of the smart contract.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1A and 1B are block diagrams of an exemplary item listing platform system for providing a smart-contract-based watermarking service, in accordance with aspects of the technology described herein;

DETAILED DESCRIPTION OF THE INVENTION

Overview

Figure 1B:
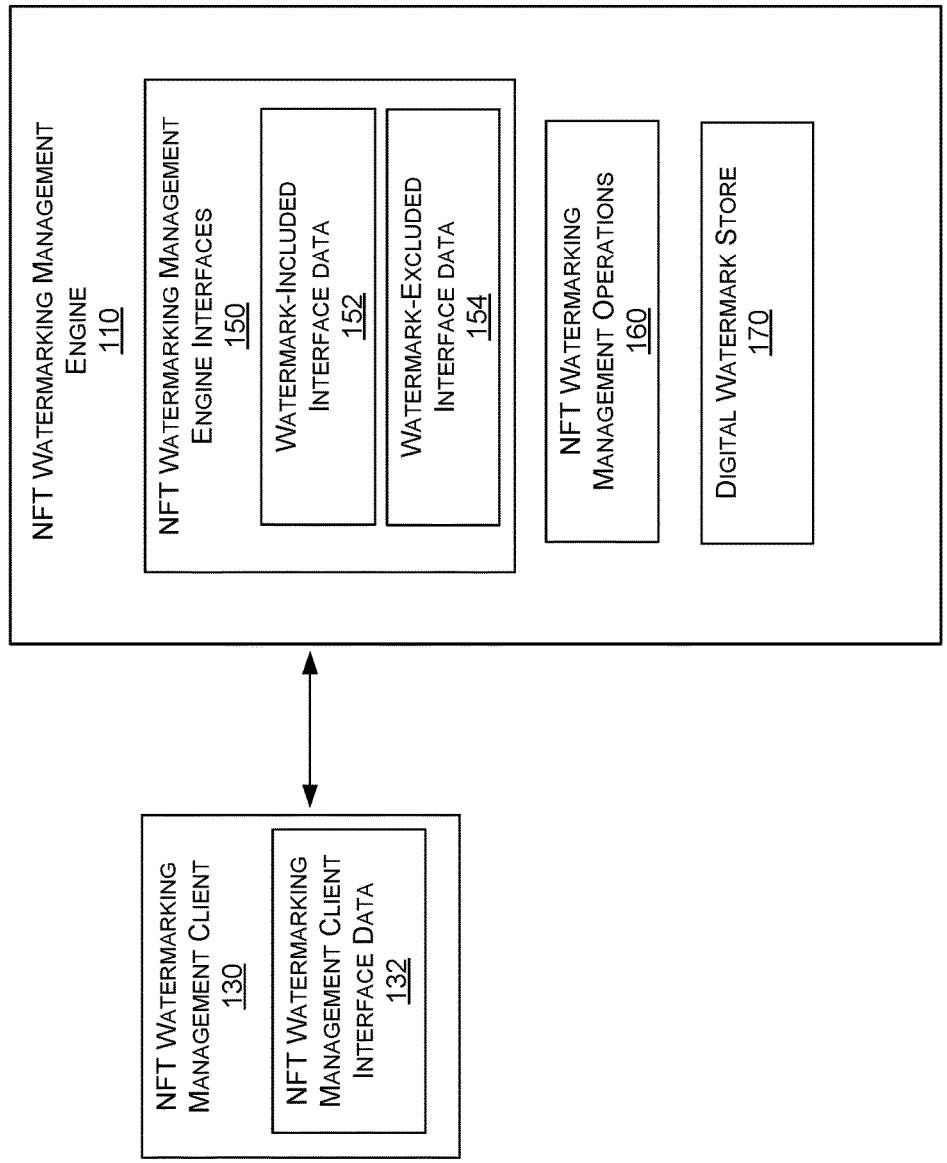

An item listing platform supports storing items (or assets) in item databases and providing a search system for receiving queries and identifying search result items based on the queries. An asset (e.g., physical asset or digital asset) refers to an item that is provided for listing on an item listing platform. Search systems support identifying, for received queries, result items from item databases. Item databases can specifically be for content platforms or item listing platforms such as EBAY content platform, developed by EBAY INC., of San Jose, California. An item listing platform may also provide a computing environment with features for managing collectible assets. For example, the item listing platform can provide asset management functionality to buy, sell, and trade culturally and historically significant collectible assets. The item listing platform can also support items (e.g., digital assets or non-fungible tokens—"NFTs") that are maintained using a blockchain system. The blockchain is a type of distributed ledger technology that consists of growing list of records—called blocks—that are securely linked together using cryptography.

Conventionally, item listing platforms are not configured with a comprehensive computing logic and infrastructure to provide blockchain-based digital watermarking for items. In particular, fraud and counterfeiting are challenges that are faced with NFT technology. An NFT digital asset, even if unique on a blockchain can be duplicated and used to mint other NFT digital assets. Unauthorized copies can be harmful to sellers, buyers, and the reputation of an item listing platform (or NFT marketplace) associated with fraudulent or counterfeit NFT digital assets. While a digital asset may still remain unique on the blockchain, other computing-based measures to curb unauthorized copying can address limitations in computing security functionality for NFT digital assets. Illegal duplication of NFT digital assets, if not properly managed, can affect efficient functioning of computing components associated an item listing platform of the NFT digital assets.

Different types of solutions have been proposed; however these solutions fall short because such solutions are not fully integrated into NFT technology and NFT management process. Without comprehensive integration in this manner, adoption by users will be limited and such a solution remains inefficient. A fully integrated technical solution can be challenging to implement because it can implicate developing different and unconventional types of data structures, operations, and interfaces within the item listing platform. As such, a comprehensive item listing platform—with an alternative basis for providing NFT digital asset security operations—can improve computing operations and interfaces in the item listing platform.

Embodiments of the present invention are directed to systems, methods, and computer storage media for, among other things, providing a smart-contract-based watermarking service. Item listing platforms lack support for non-fungible token (NFT) watermarking functionality for watermarking NFTs. A smart-contract-based watermarking service includes smart contract programming for displaying and removing digital watermarks on NFTs. An item listing platform can operate with a blockchain system to leverage smart contracts to program watermarks in association with NFT digital assets (e.g., at the time the NFT is minted). An NFT digital asset can be caused to be displayed with or without a corresponding watermark based on smart contract programming associated with a security mechanism (e.g., public key and private key pair and crypto wallet-based authentication).

At a high level, an item listing platform system supports watermarking NFT digital assets using a smart contract associated with the NFT digital asset. In particular, a user can mint and digitally watermark, or digitally watermark an existing NFT digital asset with a digital watermark to secure the NFT digital asset from fraud and counterfeiting. A digital watermark refers to a digital marker (e.g., image data, audio, or video) that is embedded into an NFT digital asset. NFT digital watermarking includes embedding the digital marker into the NFT digital asset such that a smart contract supports display or removing the digital watermark. The NFT digital asset and the digital watermark associated with the smart contract of the NFT digital asset support managing secure presentation of the NFT digital asset via interfaces.

The NFT digital asset can be programmatically presented with the digital watermark (i.e., watermark-included) or without the digital watermark (i.e., watermark-excluded) on selected interfaces associated with the item listing platform.

In this way, the item listing platform provides an NFT watermarking management system and an NFT watermarking client for performing operations associated with a smart-contract-based watermarking service for displaying or removing digital watermarks on NFT digital assets. The NFT watermarking management system can operate with legacy components (e.g., buyer interfaces and seller interfaces) of the item listing platform system to provide legacy operations that are integrated into the smart-contract-based watermarking service.

The smart-contract-based watermarking service can support different types of NFT watermarking management operations to facilitate digitally watermarking NFT digital assets. The NFT watermarking management operations can be associated with interfaces that help securely present information to improve security associated with NFT digital assets. The smart-contract-based watermarking service can specifically operate to support a minting process that is integrated with NFT watermarking management operation. An existing NFT digital asset can also be digitally watermarked independently of the minting process. For example, a user may identify and NFT digital asset and a digital watermark to cause digitally watermarking the pre-existing NFT digital asset. The smart-contract-based watermarking service can further support identifying a digital watermark to be associated with the NFT digital asset. For example, a user may select a default digital watermark (e.g., system-provided digital watermark) to associate with the NFT digital asset or the user may select a personal digital watermark (e.g., a user-provided digital watermark) to associate with NFT digital asset.

The smart-contract-based watermarking service operates with a blockchain system to store a smart contract that includes programming for displaying and removing digital watermarks. The smart contract can be stored in combination with instructions or data (e.g., location of NFT digital watermark, NFT digital watermark, NFT metadata) that can be accessed when an NFT digital asset is retrieved to be presented via an interface. For example, the smart contract can specifically include a security mechanism (e.g., username and password; 2-factor authentication; public and private keys; crypto wallet-based authentication) that are used to authorize display of the NFT digital asset without the digital watermark. The security mechanism is programmed into the smart contract and upon verification via the security mechanism the NFT digital asset can be presented without the digital watermark otherwise the NFT digital asset is presented with the watermark.

The smart-contract-based watermarking service can support different types of interfaces (e.g., seller interfaces and buyer interfaces) of the item listing platform that are selected for displaying the NFT digital asset with the watermark excluded or the watermark included. For example, the smart contract authorizes a user (e.g., seller) such that interfaces associated with the user present the NFT digital asset without the digital watermark; while other users (e.g., buyers) who have not been authorized are presented the NFT digital asset with the digital watermark.

By way of illustration, a user may mint an NFT digital asset—via a blockchain system—with a digital watermark such that a smart contract associated with the NFT digital asset controls displaying and removing the digital watermark when the NFT digital asset is presented. The user may alternatively identify an existing NFT digital asset and digitally watermark the NFT digital asset. A smart contract is created for the existing NFT digital watermark, where the smart contract implemented as a wrapper of the NFT digital asset token of the existing NFT digital asset. The existing NFT digital asset can be re-uploaded into the blockchain system. And, an NFT watermarking management client accessing the NFT digital asset can access the new NFT digital asset metadata—associated with the smart contract that wraps the NFT digital asset token—to access the NFT digital asset with the watermark included or the watermark excluded.

The item listing platform system can present an interface where the user performs operations for digitally watermarking the NFT digital asset such that the smart contract is stored in the blockchain system. The user can request to mint and digitally watermark a digital asset; or request to digitally watermark an existing NFT digital asset. The item listing platform system can also receive a request to present the NFT digital asset via different types of interfaces associated with the item listing platform system. Based on the request, the item listing platform system can query the blockchain system associated with the NFT digital asset. The query can specifically include a set of digital watermarking request attributes that support authorizing causing display of an NFT digital asset without a corresponding digital watermark.

The smart contract of the NFT digital asset evaluates the query to determine whether an interface or user associated with the query is authorized to view the NFT digital asset without the digital watermark. For example, a public and private key security mechanism or a crypto wallet-based authentication associated with the NFT digital asset can be used to authorize viewing the NFT digital asset without the digital watermark. Based on evaluating the query, the NFT digital asset is either presented with the digital watermark or without the digital watermark.

Aspects of the technical solution can be described by way of examples and with reference to FIGS. 1A-1E. FIG. 1A illustrates an item listing platform system 100 that includes NFT watermarking management system 100A, network 100B, NFT watermarking management engine 110, item listing platform legacy components 120; NFT watermarking management client 130; and external item listing platform components 140.

The item listing platform system 100 provides a system (e.g., NFT watermarking management system 100A) that includes an engine (e.g., NFT watermarking management engine 110) for performing operations (e.g., NFT watermarking management operations) discussed herein. The NFT watermarking management engine 110 can specifically communicate with NFT watermarking management client 130 (e.g., a client device) that can access the item listing platform system 100. For example, a user—via the NFT watermarking management client 130—can communicate a request to perform NFT watermarking management operations including a watermark-minting operation; a request to access an NFT digital asset—where the request authorizes viewing the NFT digital asset without a digital watermark; and a request to access an NFT digital asset—where the request does not authorize viewing the NFT digital asset without a digital watermark. The requests can be associated with corresponding digital watermarking request attributes.

A digital watermarking request attribute is a feature that communicated with a corresponding request that supports executing the request. The digital watermarking request attributes can be features of the NFT digital asset or features of the digital watermark that are used to identify the NFT digital asset, the digital watermark, the blockchain system and execute the corresponding request. For example, a request to perform a watermark-minting operation can include a location the NFT digital asset, a location of the digital watermark, and a blockchain system that are used to mint the digital watermark along with a smart contract.

In another example, a request to access an NFT digital asset can include a location of the NFT digital asset and security data that is associated with a security mechanism of a smart contract. The smart contract can use the security data to authorize viewing the NFT digital asset without the digital watermark. In another example, a request to access an NFT digital asset can include a location of the NFT digital asset and no security data. The smart contract determines that no security data is communicated with the request and does not authorize viewing the NFT digital asset without the digital watermark. It is contemplated that the contract address and token—that includes a pointer to the crypto wallet—can be in a set of digital watermarking request attributes that support accessing an NFT digital asset for presentation via an item listing platform system interface. In addition, item listing platform legacy components 120 can include a recommendations system, payment systems, and a physical storage vault that are associated with the item listing platform system 100A and can be leveraged to perform NFT watermarking management operations based on NFT digital assets, digital watermarks, and smart contracts.

With reference to FIG. 1B, FIG. 1B illustrates NFT watermarking management engine 110 including NFT watermarking management client 130 having NFT watermarking management client interface data 132, NFT watermarking management engine interfaces 150 having watermark-included interface data 152 and watermark-excluded interface data 154; NFT watermarking management operations 160; and digital watermark store 170.

The NFT watermarking management engine 110 and NFT watermarking management client 132 provide interface data (i.e., NFT watermarking management client interface data 130; watermark-included interface data 152; and watermark-excluded interface data 154) and operations (i.e., NFT watermarking management operations 160). The NFT watermarking management engine 110 and the NFT watermarking management client 130 can operate in a server-client relationship to provide the hybrid asset management service. The digital watermark store 170 can store a plurality of digital watermarks. For example, the digital watermark store 170 can include system-provided digital watermarks and user-provided digital watermarks that can be selected as digital watermarks for NFT digital assets.

By way of example, a user can communicate a request to execute a watermark-minting operation on a digital asset, such that, the digital asset is minted as an NFT in combination with the digital watermark and a smart contract that controls display of the digital watermark associated with the digital asset. In another example, a user can further communicate a request to access an NFT digital asset, where a set of digital watermarking request attributes authorize viewing the NFT digital asset without a corresponding digital watermark. Based on the request, watermark-excluded interface data 154 is generated and communicated for presentation—as NFT watermarking management client interface data 130—in the NFT watermarking management client 132.

In another example, a user can further communicate a request to access an NFT digital asset, where a set of digital watermarking request attributes do not authorize viewing the NFT digital asset without a corresponding watermark. Based on the request, watermark-included interface data 152 is generated and communicated for presentation—as NFT watermarking management client interface data 130—in the NFT watermarking management client 132.

Figure 1C:
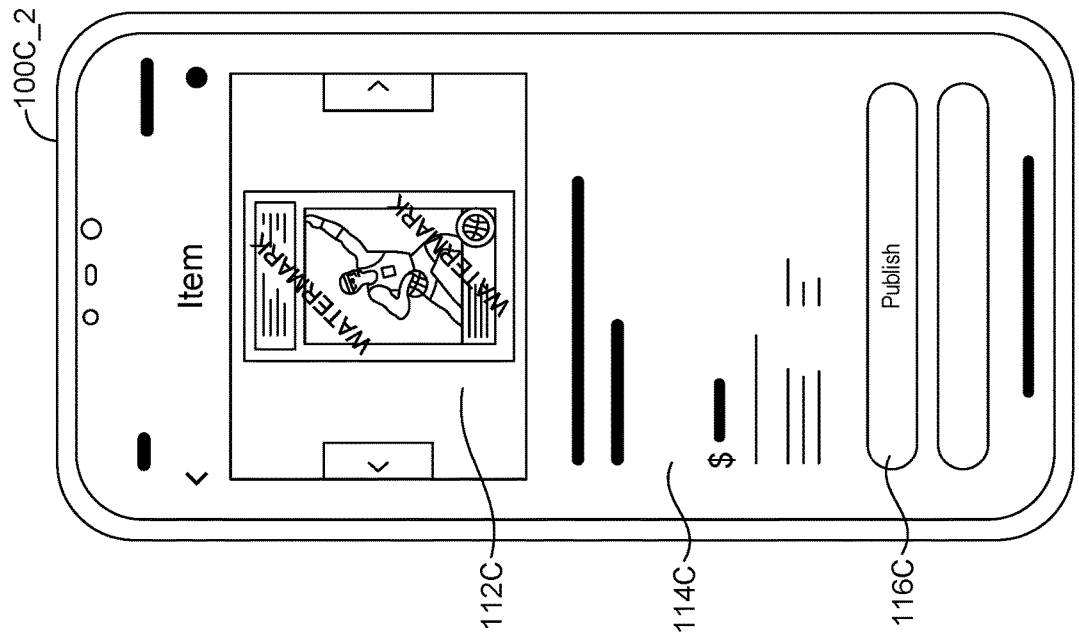
FIG. 1C-1E are NFT watermarking management system interfaces of an exemplary item listing platform system for providing a smart-contract-based watermarking service, in accordance with aspects of the technology described herein.
Figure 1C:
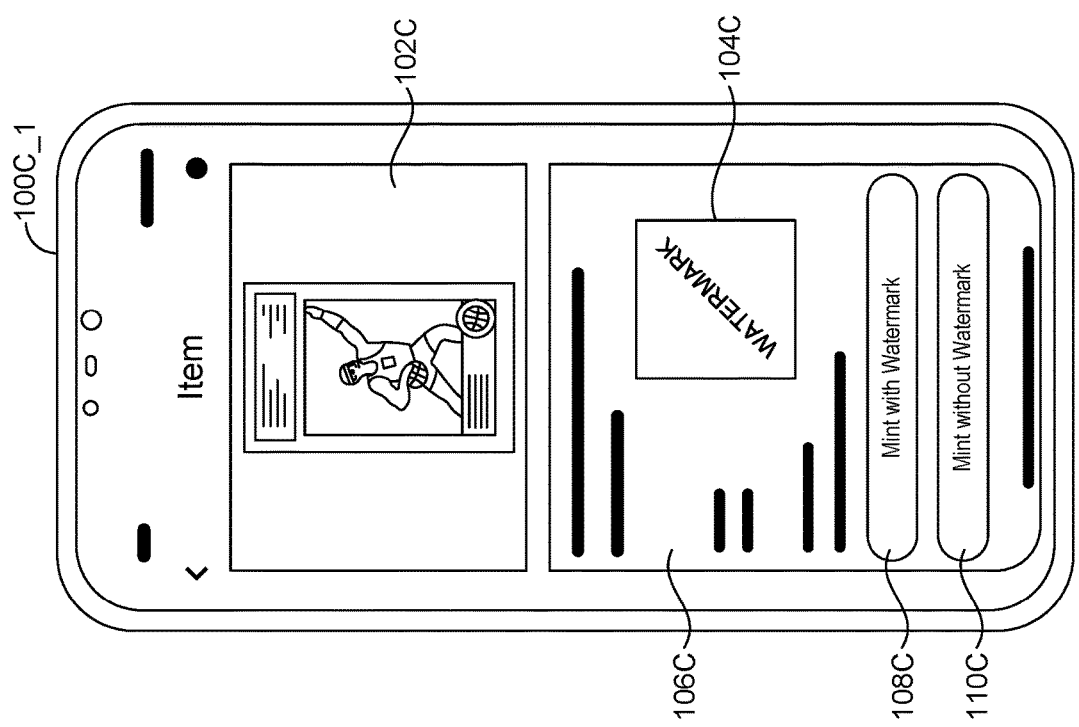

With reference to FIG. 1C, FIG. 1C illustrates item listing platform system interfaces 100C_1 and 100C_2 associated with minting an NFT digital asset with a digital watermark associated with a smart contract. The item listing platform interface 100C_1 includes NFT digital asset 102C; digital watermark 104C; digital watermarking request attributes fields 106C; button 108C that triggers minting the NFT digital asset with a digital watermark; and button 110C that triggers minting the NFT digital asset without a digital watermark. The item listing platform system interface 100C_2 includes watermarked NFT digital asset 112C; NFT digital asset listing data 114C; and button 116C that triggers publishing the NFT digital asset in the item listing platform system.

By way of illustration, a user can navigate to the item listing platform system interface 100C and identify the NFT digital asset 102C and the digital watermark 104C for performing a watermark-minting operation. The item listing platform interface 100C can display a set of digital watermarking request attributes or request entry of digital watermarking request attributes. Upon entry of the digital watermarking request attributes, the user can select the button 108C to trigger minting the NFT digital asset; or select the button 110C to trigger minting the NFT digital asset without the digital watermark. Based on selecting the button 108C, the item listing platform system interface 100C_2 can be generated to display watermarked NFT digital asset 112C and NFT digital asset listing data 114C. The user can select the button 116C to publish the NFT digital asset in the item listing platform system.

Figure 1D:
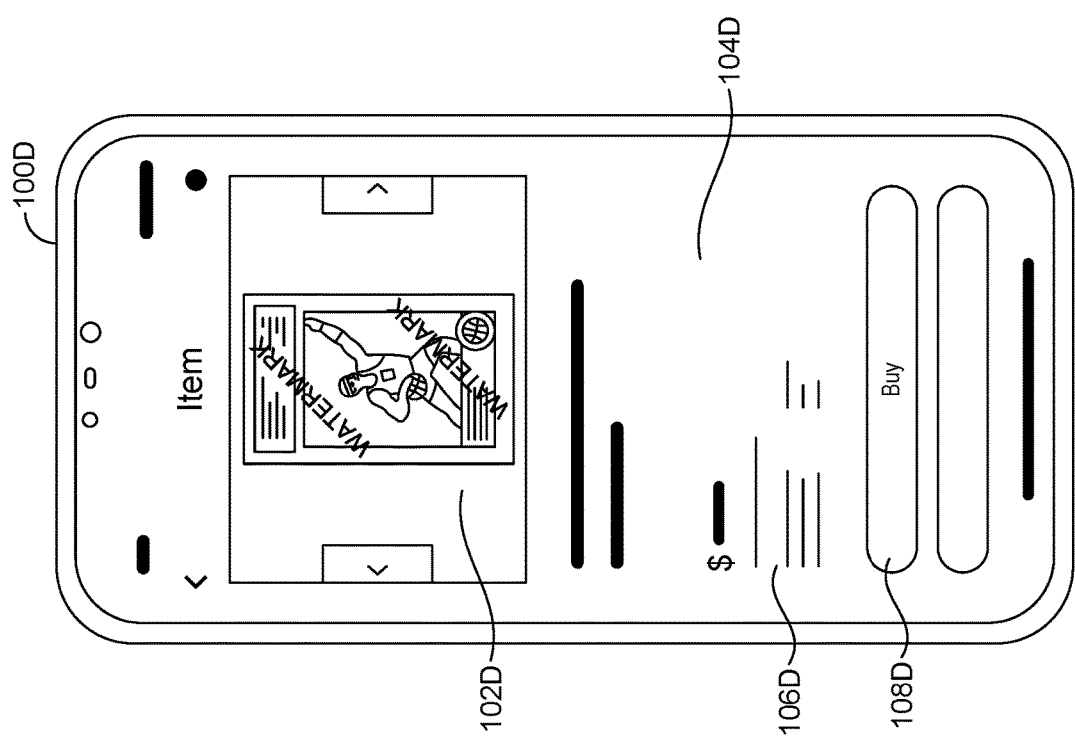

With reference to FIG. 1D, FIG. 1D illustrates an item listing platform system interface 100D that illustrates generally a watermark-included NFT digital asset interface with watermark-included interface data. In operation, item listing platform system interface 100D can correspond to an NFT digital asset without authorization (e.g., via a security mechanism), such that, the NFT digital asset metadata communicated to support display of the NFT digital asset corresponds to watermark-included interface data. The listing platform system interface 100D includes watermark-included NFT digital asset 102D; digital watermarking request attributes fields 104D; NFT digital asset listing data 106D; button 108D that triggers buying the NFT digital asset. For example, a user can execute a search for an item (e.g., via a search interface), where the search identifies the NFT digital asset as a search result item. Based on selecting the search result item, the user navigates to the item listing platform system interface 100D that includes watermark-included interface data, as described above.

Figure 1E:
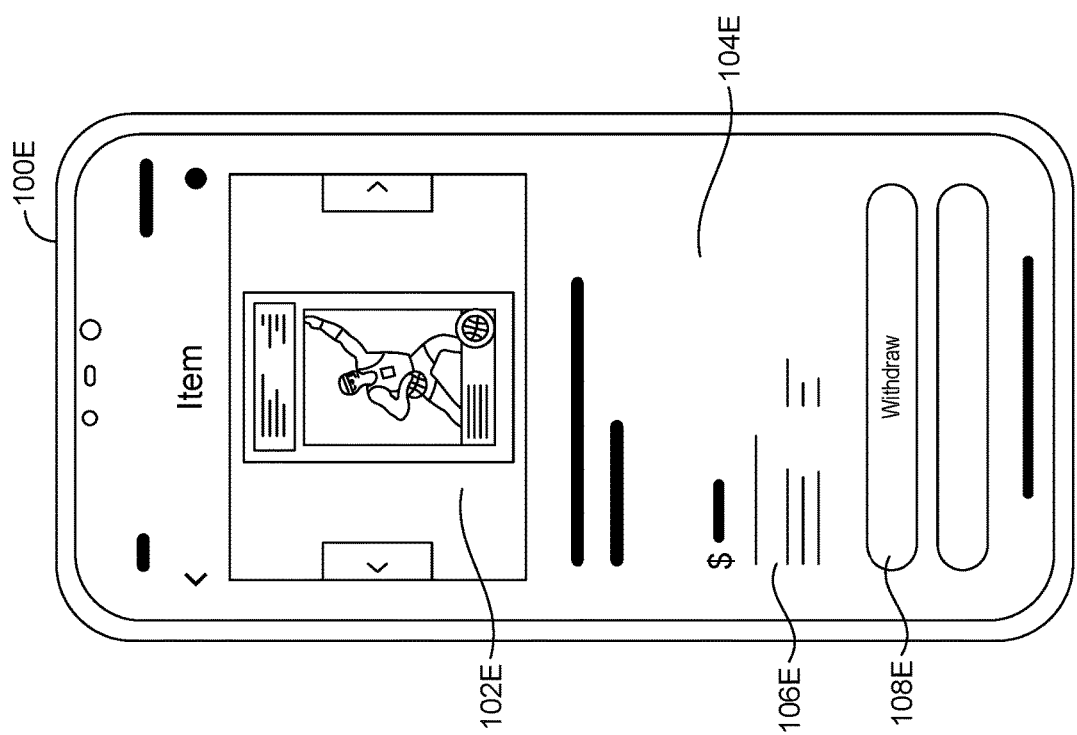

With reference to FIG. 1E, FIG. 1E illustrates an item listing platform system interface 100E that illustrates generally a watermark-excluded NFT digital asset interface with watermark-excluded interface data. In operation, item listing platform system interface 100E can correspond to an NFT digital asset with after receiving authorization (e.g., via a security mechanism), such that, the NFT digital asset metadata communicated to support display of the NFT digital asset corresponds to watermark-excluded interface data. The item listing platform system interface 100E includes watermark-excluded NFT digital asset 102E, digital watermarking request attributes fields 104E; NFT digital asset listing data 106E, button 108E that triggers withdrawing the NFT digital asset from the item listing platform system. For example, a user can execute a search for an item (e.g., via a search interface) that identifies the NFT digital asset as a search result item. Based on selecting the search result item, the user navigates to the item listing platform system interface 100E that includes watermark-excluded interface data, as described above.

Figure 2A:
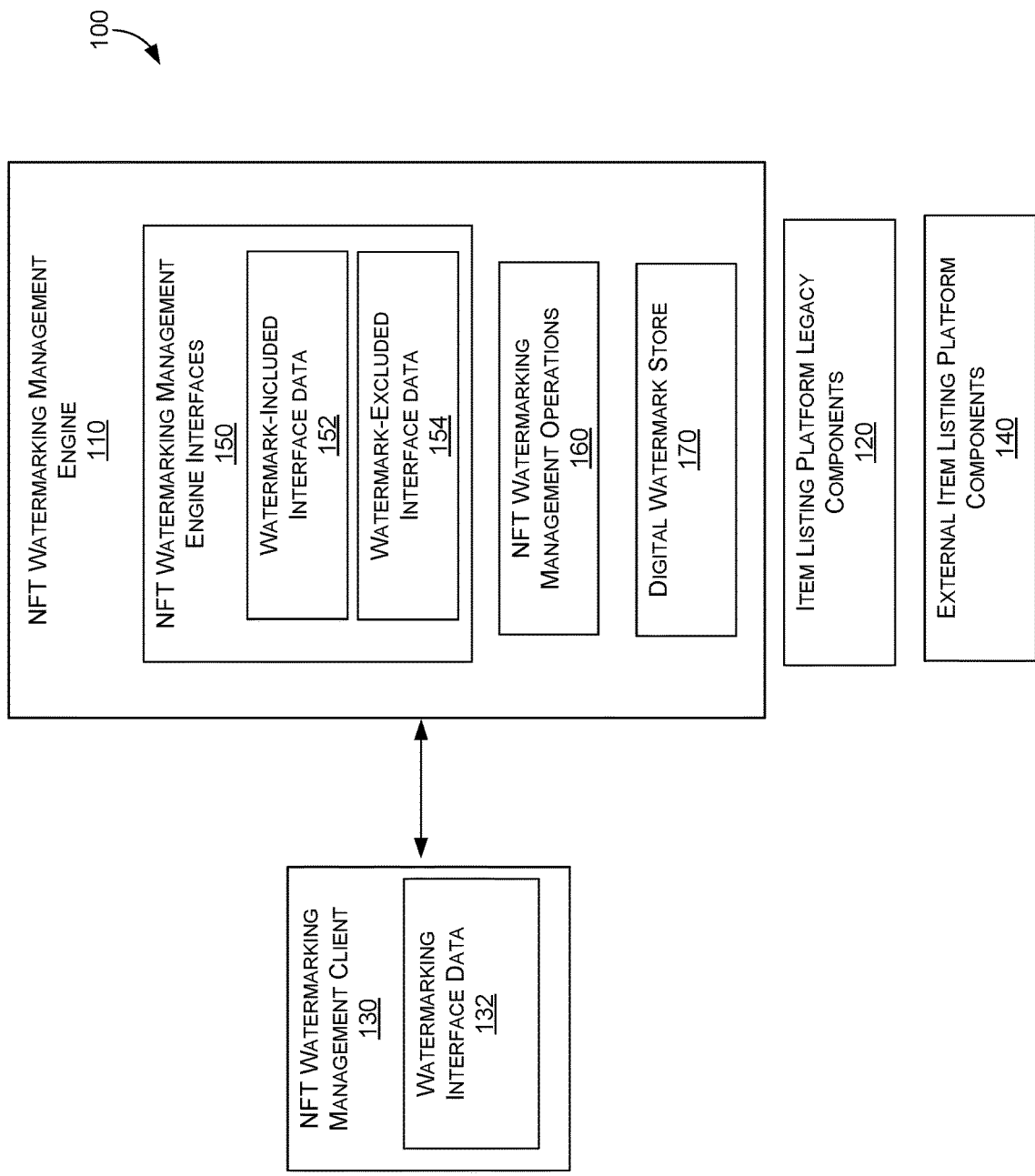
FIG. 2A is a block diagram of an exemplary item listing platform system for providing a smart-contract-based watermarking service, in accordance with aspects of the technology described herein.
Figure 2B:
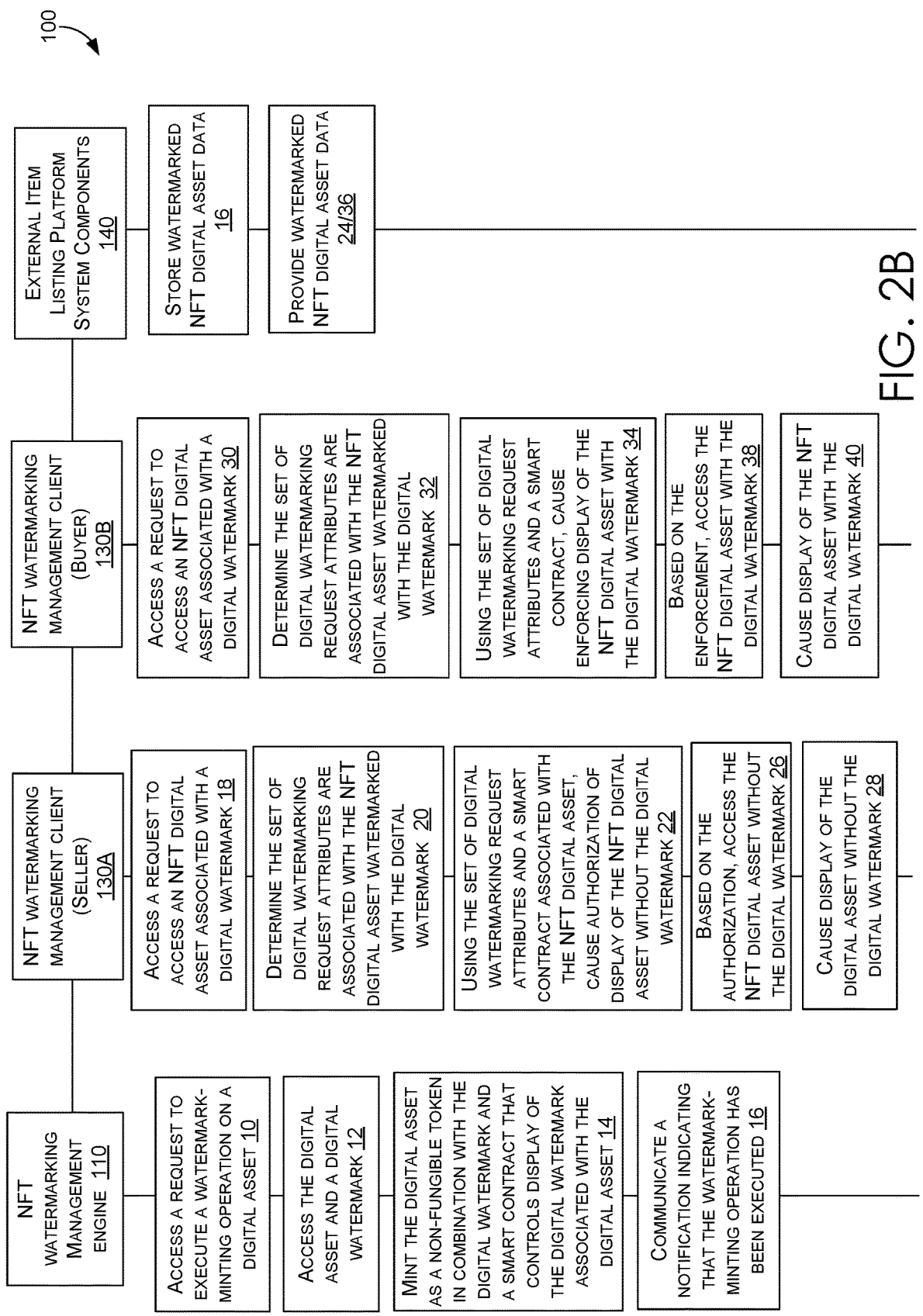
FIG. 2B is a block diagram of an exemplary item listing platform system for providing a smart-contract-based watermarking service, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6A, 6B, 7 and 8 for use in implementing embodiments of the technical solution are shown. Generally the technical solution environment includes a technical solution system suitable for providing the example item listing platform system 100 in which methods of the present disclosure may be employed. In particular, FIG. 2A shows a high level architecture of the item listing platform system 100 in accordance with implementations of the present disclosure. Among other engines, managers, generators, selectors, or components not shown (collectively referred to herein as "components"), the item list platform system 100 of FIG. 2A corresponds to FIGS. 1A and 1B.

With reference to FIG. 2A, FIG. 2A illustrates item listing platform system 100 with NFT watermarking management engine 110; item listing platform legacy components 120; NFT watermarking management client 130 having NFT watermarking management client interface data 132; external item listing platform components 140; NFT watermarking management engine interfaces 150 including watermark-included interface data 152 and watermark-excluded interface data; NFT watermarking management operations 160; and digital watermark store 170.

The NFT watermarking management engine 110 can receive a request to execute a watermark-minting operation on a digital asset. The request can include a set of digital watermarking request attributes. The request can be received from the NFT watermarking management client 130 associated with a user (e.g., a seller). The request can be received via a minting interface or other type of interface associated with the NFT watermarking management client 130. The watermark-minting operation is associated with a smart-contract-based service that implements a smart contract with programming for displaying and removing digital watermarks on NFTs. The smart-contract-based service causes display of NFT digital assets with digital watermarks or without digital watermarks based on smart contracts that control display of the digital watermarks.

The NFT watermarking management engine 110 accesses the digital asset and the digital watermark based on the set of digital watermarking request. The set of digital watermarking request attributes can identify digital asset, the digital watermark, and a blockchain system for executing the watermark-minting operation. The digital watermark can be a system-provided digital watermark or a user-provided digital watermark. The NFT watermarking management engine 110 mints the digital asset as a non-fungible token in combination with the digital watermark and a smart contract that controls display of the digital watermark associated with the digital asset. Minting the NFT digital asset can include communicating one or more digital watermarking request attributes to the blockchain system as watermarked NFT digital asset data.

The NFT watermarking management engine 110 can operate with an NFT watermarking management client 130 that accesses a request to access an NFT digital asset associated with a digital watermark. The request can include a set of digital watermarking request attributes. Based on the set of digital watermarking attributes, the NFT watermarking management client 130 can determine that the set of digital watermarking request attributes are associated with the NFT digital asset watermarked with the digital watermark. Using the set of digital watermarking attributes and contract, the NFT digital asset can cause the smart contract to authorize display of the NFT digital asset without the digital watermark.

One or more digital watermarking request attributes can be communicated to the smart contract to support authorizing display of the NFT digital asset without the digital watermark. The smart contract is configured to access the one or more digital watermarking request attributes to control display of the digital watermark associated with the digital asset. The smart contact include a security mechanism that processes the one or more digital watermarking request attributes to determine to authorize display of the NFT digital asset without the digital watermark or enforce display of the NFT digital asset with the digital watermark.

Based on the authorization, the NFT watermarking management client 130 accesses the NFT digital asset without the digital watermark and causes display of the NFT digital asset without the digital watermark. The NFT digital asset can be caused to be displayed on an interface associated with a seller of the NFT digital asset. Alternatively, based on the enforcement, the NFT watermarking management client 130 accesses the NFT digital asset with the digital watermark and causes display of the NFT digital asset with the digital watermark.

With reference to FIG. 2B, FIG. 2B illustrates NFT watermarking management engine 110, NFT watermarking management client 130A, NFT watermarking management client 130B, and blockchain system 150. At block 10, the NFT watermarking management engine accesses a request to execute a watermark-minting operation on a digital asset; at block 12, accesses the digital asset and a digital watermark; and at block 14, mints the digital asset a non-fungible token in combination with the digital watermark and a smart contract that controls display of the digital watermark associated with the digital asset. At block 10, the blockchain system stores watermarked NFT digital asset data. At block 16, the NFT watermarking management engine communicates a notification indicating that the watermark-minting operation has been executed.

At block 18, the NFT watermarking management client 130A accesses a request to access an NFT digital asset associated with a digital watermark; at block 20, determines the set of digital watermarking request attributes are associated with the NFT digital asset watermarked with the digital watermark. At block 22, the NFT watermarking management client 130A uses set of digital watermarking request attributes and a smart contract associated with the NFT digital asset watermarked with the digital watermark to cause authorization of display of the NFT digital asset without the digital watermark. At block 24, the blockchain system provides watermarked NFT digital asset data. At block 26, the NFT watermarking management client 130A, based on the authorization, accesses the NFT digital asset without the digital watermark; and at block 28, causes display of the digital asset without the digital watermark.

At block 30, the NFT watermarking management client 130B accesses a request to access an NFT digital asset associated with a digital watermark; at block 32, determines the set of digital watermarking request attributes are associated with the NFT digital asset watermarked with the digital watermark. At block 34, the NFT watermarking management client 130B uses set of digital watermarking request attributes and a smart contract associated with the NFT digital asset watermarked with the digital watermark to cause enforcing display of the NFT digital asset with the digital watermark. At block 36, the blockchain system provides watermarked NFT digital asset data. At block 38, the NFT watermarking management client 130A, based on the enforcement, accesses the NFT digital asset with the digital watermark; and at block 40, causes display of the digital asset with the digital watermark.

Example Methods

Figure 3:
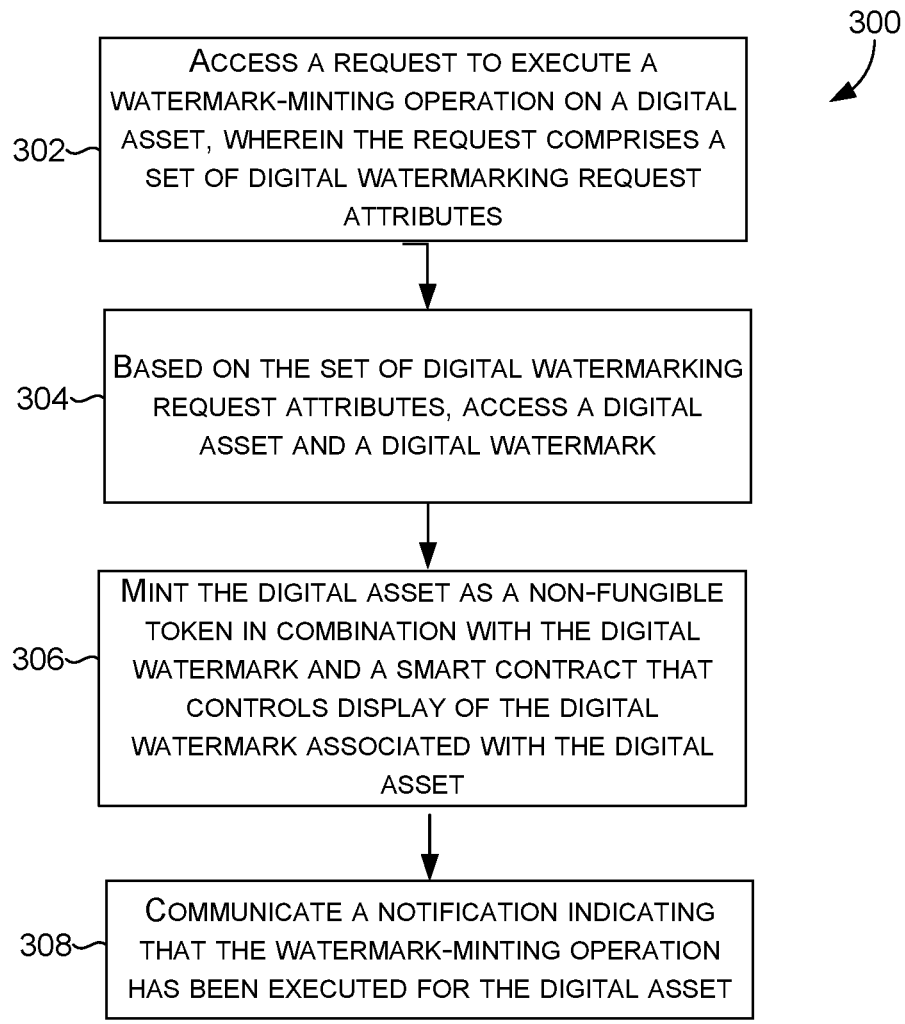
FIG. 3 provides a first exemplary method of providing a smart-contract-based watermarking service, in accordance with aspects of the technology described herein.
Figure 4:
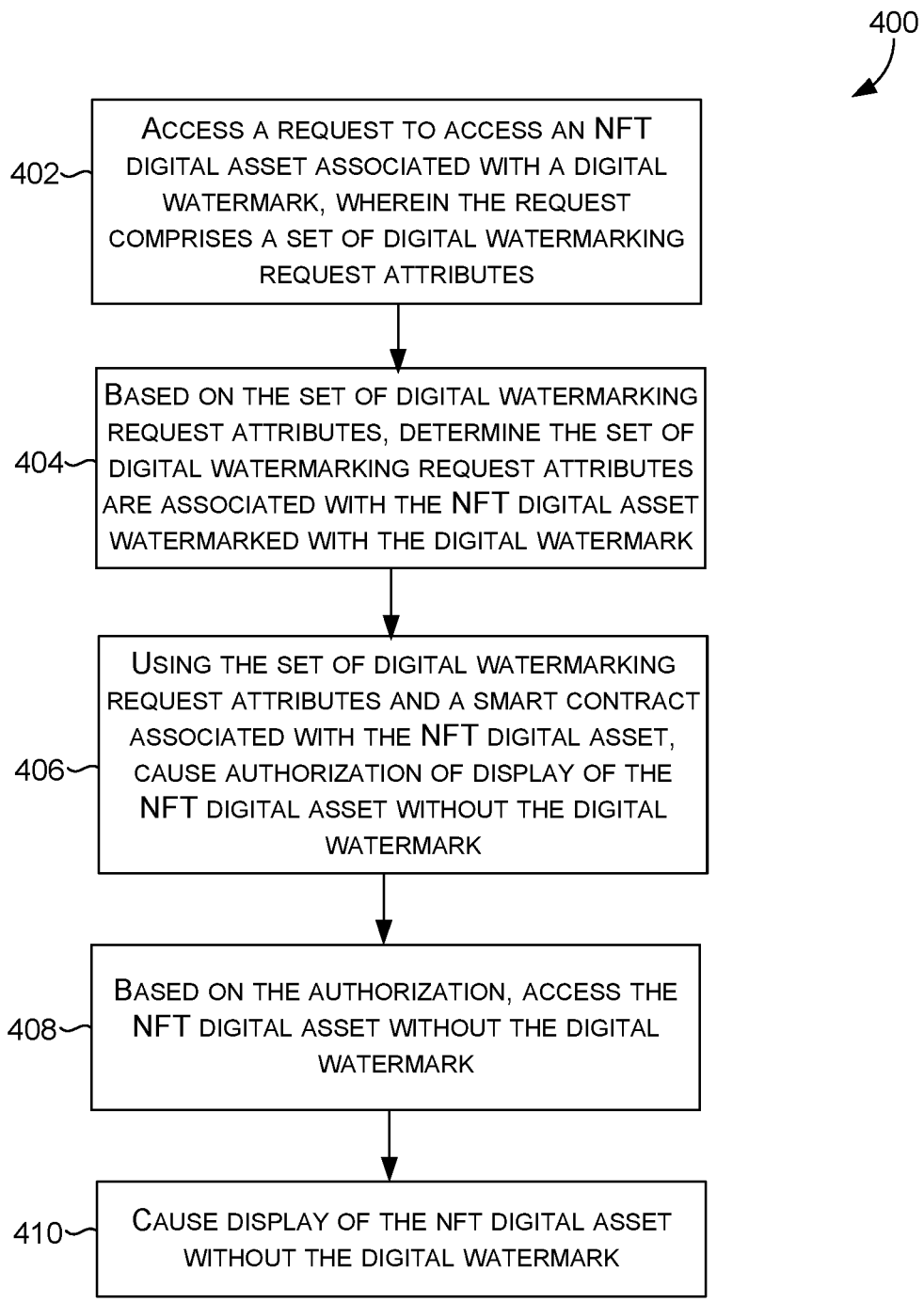
FIG. 4 provides a second exemplary method of providing a smart-contract-based watermarking service, in accordance with aspects of the technology described herein.
Figure 5:
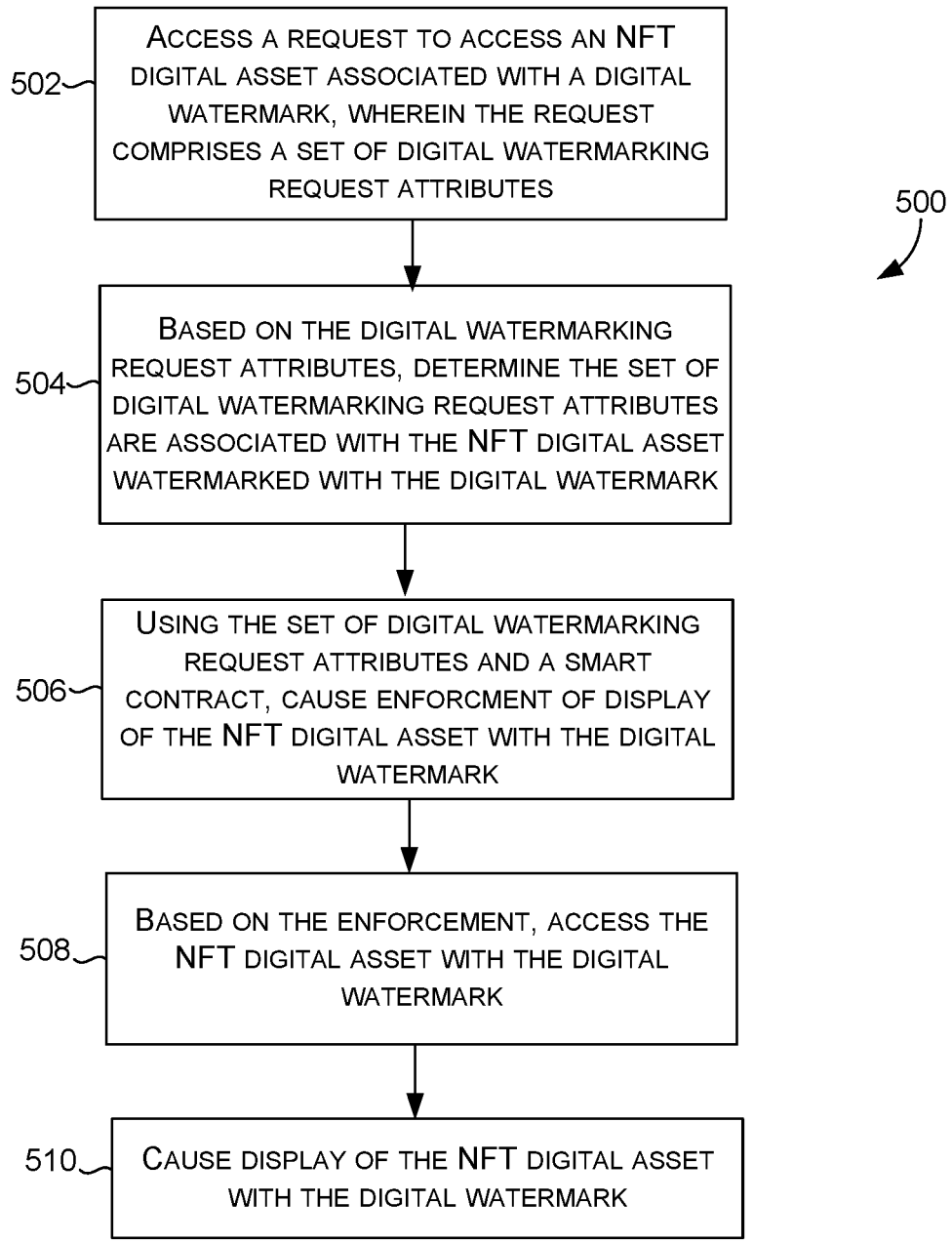
FIG. 5 provides a third exemplary method of providing a smart-contract-based watermarking service, in accordance with aspects of the technology described herein.

With reference to FIGS. 3, 4, and 5 flow diagrams that illustrate methods for providing a smart-contract-based watermarking service. The methods may be performed using the item listing platform system described herein. In embodiments, one or more computer-storage media having computer-executable or computer-useable instructions embodied thereon that, when executed, by one or more processors can cause the one or more processors to perform the methods (e.g., computer implemented method) in an item listing platform system (e.g., computerized system or computer system).

Turning to FIG. 3, a flow diagram is provided that illustrates a method 300 for providing a smart-contract-based watermarking service. At block 302, an NFT watermarking management engine accesses a request to execute a watermark-minting operation on a digital asset. The request comprises a set of digital watermarking request attributes. At block 304, based on the set of digital watermarking attributes, the NFT watermarking management engine accesses a digital asset and a digital watermark. At block 306, the NFT watermarking management engine mints the digital asset as a non-fungible token in combination with the digital water and a smart contract that controls displaying the digital watermark associated with the digital asset. At block 308, the NFT watermarking management engine communicates a notification indicating that the watermark-minting operation has executed.

Turning to FIG. 4, a flow diagram is provided that illustrates a method 400 for providing a smart-contract-based watermarking service. At block 402, an NFT watermarking management client accesses a request to access an NFT digital asset associated with a digital watermark. The request comprises a set of digital watermarking request attributes. At block 404, based on the digital watermarking request attributes, the NFT watermarking management client determines that the set of the digital watermarking request attributes are associated with the NFT digital asset watermarked with the digital watermark. At block 406, using the set of digital watermarking request attributes and a smart contract associated with the NFT digital asset, NFT watermarking management client causes authorization of display of the NFT digital asset without the digital watermark. At block 408, based on the authorization, the NFT watermarking management client, accesses the NFT digital asset without the digital watermark. At block 410, the NFT watermarking management client causes display of the NFT digital asset without the digital watermark.

Turning to FIG. 5, a flow diagram is provided that illustrates a method 500 for providing a smart-contract-based watermarking service. At block 502, an NFT watermarking management client accesses a request to access an NFT digital asset associated with a digital watermark. The request comprises a set of digital watermarking request attributes. At block 504, based on the digital watermarking request attributes, the NFT watermarking management client, determines the set of digital watermarking request attributes are associated with the NFT digital asset watermarked with the digital watermark. At block 506, using the set of digital watermarking request attributes and a smart contract, NFT watermarking management client enforces display of the NFT digital asset with the digital watermark. At block 508, based on the enforcement, the NFT watermarking management client accesses the NFT digital asset with the digital watermark;

Technical Improvement

Embodiments of the present invention have been described with reference to several inventive features (e.g., operations, systems, engines, and components) associated with an item listing platform system. Inventive features described include: operations, interfaces, data structures, and arrangements of computing resources associated with providing the functionality described herein relative with reference to an NFT watermarking management system.

Embodiments of the present invention relate to the field of computing, and more particularly to item listing platform systems. The following described exemplary embodiments provide a system, method, and program product to, among other things, execute NFT watermarking man management operations that provide secure NFT digital assets associated with digital watermarks. Therefore, the present embodiments have the capacity to improve the technical field of item listing platform technology by providing more secure computing operations. For example, the ordered combination of security steps described for this technical solution provide a specific improvement over prior systems, resulting in an improved security for an item listing platform system. In particular, the particular ordered combination of steps associated with NFT digital assets and digital watermarks do not use conventional methods. The technical solution addresses conventional item listing platforms' lack of smart-contract-based management of NFT digital asset based on improving item listing platform technology by improving ordered combination of steps for securing NFT digital assets.

Functionality of the embodiments of the present invention have further been described, by way of an implementation and anecdotal examples—to demonstrate that the operations for providing a smart-contract-based watermarking service as a solution to a specific problem in item listing platform technology to improve computing operations in item listing platform systems. Overall, these improvements result in less CPU computation, smaller memory requirements, and increased flexibility in item listing platform systems when compared to previous conventional item listing platform system operations performed for similar functionality.

Additional Support for Detailed Description of the Invention

Example Blockchain Computing Environment

Figure 6A:
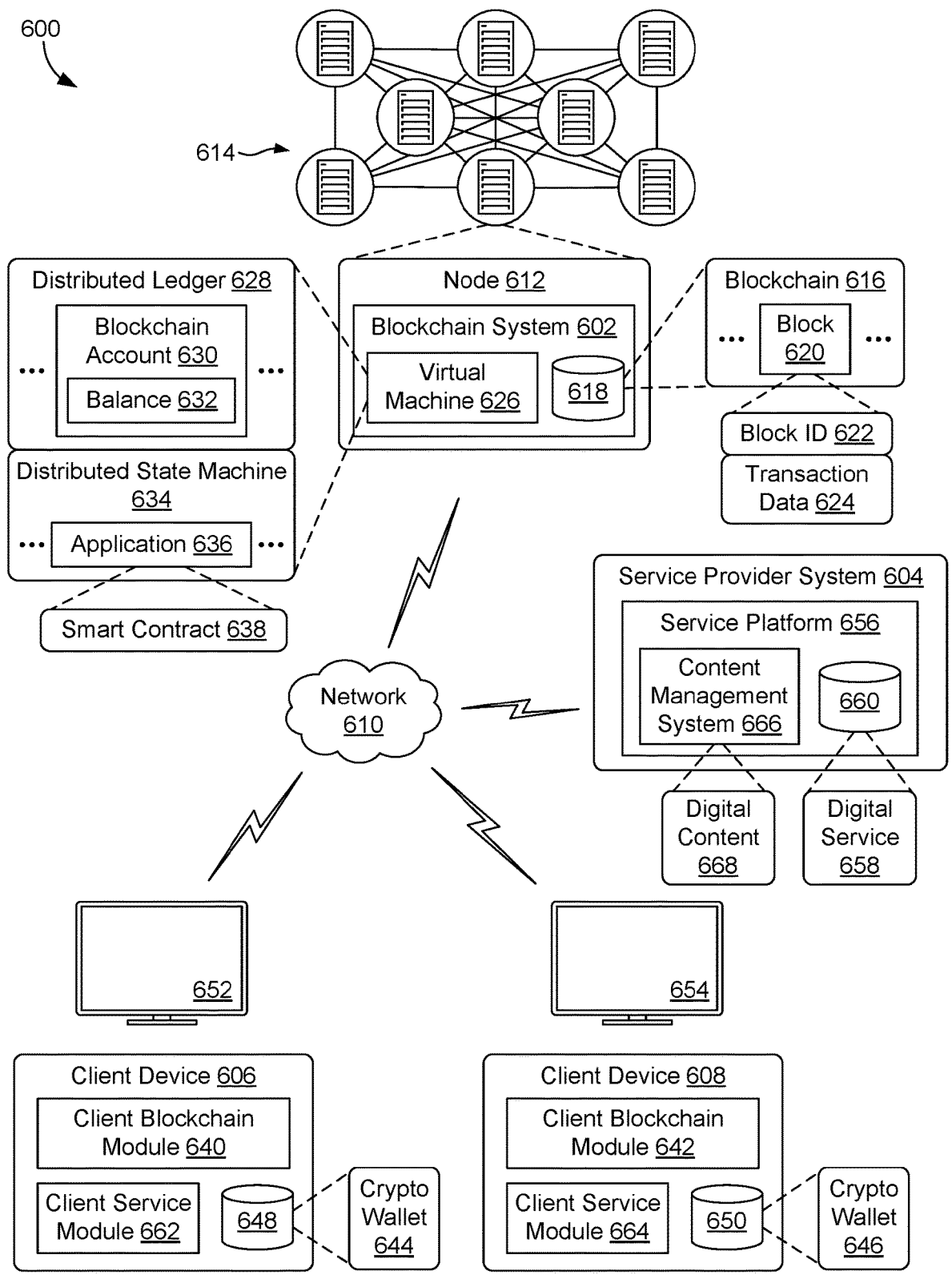
FIGS. 6A and 6B provide block diagrams of an exemplary blockchain computing environment suitable for use in implementing aspects of the technology described herein.
Figure 6B:
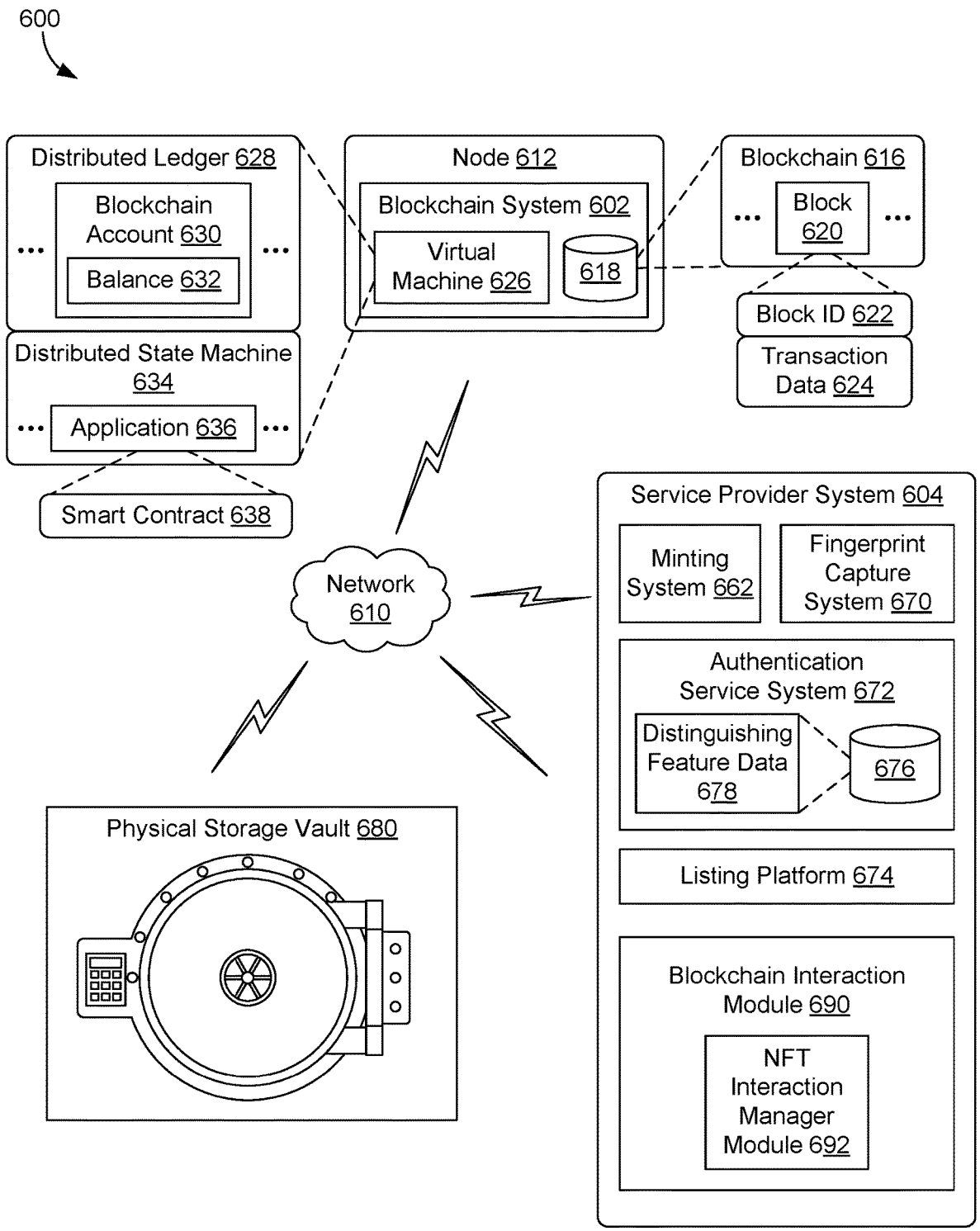

With reference to FIGS. 6A and 6B, FIGS. 6A and 6B illustrate an example blockchain computing environment 600 in which implementations of the present disclosure may be employed. In particular, the blockchain computing environment 600 includes a blockchain system 602, a service provider system 604, a plurality of client devices (e.g., client device 606 and client device 608) that are communicatively coupled, to one another, via a network 610. The blockchain system 602 is implemented by a plurality of nodes (e.g., node 612).

Node 612 is a runtime environment implemented using a processor, memory, and network resources of respective computing device 614 that operate as the infrastructure of the blockchain 616. A plurality of nodes store, communicate, process, and manage data that makes up the blockchain 616. The plurality of nodes are interconnected as illustrated to exchange data via the network 610.

The blockchain 616 is formed using a plurality of blocks (e.g., block 620). Block 620 includes a block identifier 622 and transaction data 624. Transaction data 624 of block 620 includes batches of validated transactions that are hashed and encoded. Each block 620 includes a cryptographic hash of a prior block in the blockchain, thereby linking the blocks to each other to form the blockchain 616. As a result, the plurality of blocks cannot be altered retroactively without altering each subsequent block in the blockchain 616 and in this way protects against attacks from malicious parties.

In order to generate the blocks 620 for addition to the blockchain 616, a node 612 is implemented as a "miner" to add a block of transactions to the blockchain 616. The other nodes of the blockchain system 602 then check if the block of transaction is valid, and based on this, determine whether to accept or reject this data. If valid, the block of transactions is stored—as transaction data 624 along with a block ID 622 for a respective block 620—"at the end" or "at the top" of the blockchain 616 along with a hash of a previous block in the chain. Nodes 612 then broadcasts this transaction history via the network 610 for sharing with other nodes. This acts to synchronize the blocks 620 of the blockchain 616 across the distributed architecture of the blockchain system 602. Other types of nodes are also included as part of the blockchain system 602. In one such example, full nodes are nodes that store an entirety of the blockchain 616—for example, locally in computer-readable storage media of a respective store device 618. Other types of nodes are also employed to implement additional functionality to govern voting events, execution or protocol operations, and rules enforcement.

Cryptocurrencies are the native asset of the blockchain 616, and tokens are created "on top" of these blockchains. Tokens may be created "on top" of the blockchain 616 by using a "token standard" which allows the token to interoperate with the blockchain 616's network of nodes according to one or more protocols of the blockchain, such that transaction data and the hashes of the blocks are leveraged to create, trade, and update tokens. By way of example, the Ethereum blockchain's native asset is ether (ETH), a cryptocurrency. Nevertheless, tokens may be created on top of Ethereum's blockchain by using one or more of Ethereum's token standards for creating tokens, such as by using ERC-20, ERC-721, ERC-1155, and EIP-2309.

The blockchain system 602 implements a virtual machine 626 that is representative of a diverse range of functionality made possible by leveraging the blockchain 616. In a first such example, the virtual machine 626 implements a distributed ledger 628 of accounts 630 and associated balances 632 of those accounts 630. Distributed ledgers 628 support secure transfer of digital assets (e.g. tokens or coins of cryptocurrencies) between accounts 630 without management by a central authority through storage as part of the transaction data 624 of the blockchain 616. Through synchronized and distributed access supported by the blockchain 616 as described above, changes to balances 632 (e.g., a number of tokens) are visible to any entity with access to the blockchain 616. Techniques are also implemented to support management of balances 632 across the accounts 630—for example, to enforce rules that a respective account 630 does not transfer more tokens than are available based on a balance 632 specified for that account 630.

In another example, the virtual machine 626 implements a distributed state machine 634 that supports application 636. The distributed state machine 634 is implemented along with the transaction data 624 within the blocks of the blockchain 116 such that the blocks describe accounts and balances as described above for the distributed ledger 628. The transaction data 624 also supports a machine state, which can change from block to block of the blockchain

616. In one example, the application 636 is executable as part of a "Turing-complete" decentralized virtual machine that is distributed across the nodes of the blockchain system 602. As Turing-complete, the application 636 is computationally universal to perform computing device operations, such as, logic or computing functions. The application 636 is executable by a processing system of a computing device as software that is storable in a computer-readable storage media of nodes 612 to perform a variety of operations.

An example of an application 636 that is executable as part of the distributed state machine 634 is a smart contract 638. A smart contract is a computer program or a transaction protocol that is intended to automatically execute, control or document events and actions according to the terms of a contract or an agreement. A smart contract 638 is executable automatically and without user intervention (or with partial human interaction as inputs when desired) by nodes of the distributed state machine 634. Execution of the smart contract 638 includes obtaining data from a specified data source (e.g., devices, APIs, and so forth that are accessible via the network 610), and based on this data, initiating one or more operations based on conditions described in the smart contract 138. In one example, the smart contract 638 is a type of account 130 that includes a balance 632 and initiates transactions based on conditions specified by the smart contract 638—for example, to support automated escrow and other functionalities. A variety of other examples are also contemplated that support implementation of any executable operations by a computing device using software.

In an example of a token, the smart contracts 638 implement non-fungible tokens (NFTs). NFTs include digital assets that are provably unique and as such cannot be duplicated or divided. As such, NFTs are not exchanged as having a same value as coins in cryptocurrency, but rather are digital assets having identifying information recorded as part of the smart contract 638. This identifying information is immutably recorded on that token's blockchain 616 and this ownership of the token is also recorded and tracked. A variety of information is storable as part of the digital content represented by the NFT, examples of which include digital images, digital media, digital contract, executable instructions of an application 636 as described above, secure file links, in-game tokens, digital artwork, and so forth.

By way of illustration, an NFT can correspond to an item (e.g., a physical item or digital content) and describes that item. Thus, the NFT functions to verify the item that is the subject to the transaction and as such increases value of the item through publicly verifiable ownership of the NFT. To leverage this "twinning" blockchain queries initiated by the service provider system 604 can be used to determine and verify ownership of the NFT. The data received from the blockchain queries provides the service provider system 604 with up-to-date data. This data is leveraged such that digital content 668 is exposed to the correct entity, and as such, improve the operation of the service provider system 604. Other examples of tokens are also contemplated that are fungible and as such are interchangeable with each other.

Client devices (e.g., client device 606 and client device 608) include respective client blockchain modules (e.g., blockchain module 640 and blockchain module 642) that are representative of functionality of client devices to interact with the blockchain system 602. For example, this functionality includes management of respective crypto wallets (e.g., crypto wallet 644 and crypto wallet 646) in local storage devices (e.g., local storage device 648 and local storage device 650). The crypto wallets can store public and private cryptographic keys that are used to support interaction with the blockchain system 602, and particularly respective accounts 620 of the blockchain system 602, using respective user interfaces (e.g., user interface 652, and user interface 654). Functionality of the client devices to access digital services of the service provider system 604 is represented by respective client service modules. The client service modules are configurable as browsers, network-enabled applications, third-party plugins, and so on to access the digital services 158 via the network 110.

A public key supports transactions to an address of an account derived from the public key, which are stored as part of the blockchain 616 to memorialize the transaction as part of transaction data 624. In one example, an address of an account is generated by first generating a private key (e.g., using a randomization technique). The corresponding public key is derived from the private key and the address of the account is then derived from the public key—for example, an entirety of the public key or as a shortened version of the public key. The private key is used to "unlock" transactions that are "locked" by the public key and gain access to the account—for example, access to coins, tokens, or other information maintained as part of the transaction.

In one example, a transaction is initiated by the client device 606 with client device 608. Data of the transaction is encrypted using a public key. The transaction is then signed by the client device 608 using the private key which indicates that the transaction has not been modified—for example, by encrypting the data being sent in the transaction using the private key. The transaction is then verifiable as authentic by using the public key included with the data. The nodes (e.g., node 612) using the accompanying public key to automatically verify authenticity that the transaction is signed using the private key. Transactions that fail authentication are rejected by the nodes. Authentic transactions are used as part of transaction data 624 in minting blocks by the nodes that are added to the blockchain 616 as part of the distributed ledger 628. In this way, the virtual machine 626 of the blockchain system 602 supports a variety of functionality through use of the distributed ledger 628, distributed state machine 634, and other blockchain and cryptographic functionality.

The block chain computing environment 600 also includes a service provider system 604 implementing a service platform 656 of digital services 658, illustrated as maintained in storage device 660 and are executable via a processing system. Digital services 658 involve electronic delivery of data and implementation of data functionality by computing devices to support a range of computing device operations. Digital services 658, for instance, include creation, management, and dissemination of digital content via the network 610 (e.g., webpages, applications, digital images, digital audio, digital video, and so forth). The digital services 658 are also implemented to control access to and transfer physical goods and services through corresponding digital content (e.g., sales, product listings, advertisements, etc.). Digital services 658 further pertain to operation of computational resources (e.g., processing, memory, and network resources) of computing devices that support the access to and management of digital content by the system.

The service provider system 604 also includes a content management system 666. The content management system 666 by the service provider system 604 is configured to generate, expose, and control access to digital content 668. The digital content 668 may be controlled through use of an application (e.g., application 636) generated by the service provider system 604 and executed by the distributed state machine 634. The service platform 656, for instance, includes a digital service 658 configured to support transactions of items (e.g., physical items or digital content, using service provider accounts).

By way of illustration, the digital content 668 is configurable to encourage retention of an NFT by an entity, such as a user, that owns the item. An example of this is configuring the digital content 668 to include an offer. The offer is redeemable by the service provider system 604 encourage future interaction with the service provider system 604, such as through a reduction in a transaction fee for a subsequent sale of the item or a different item via the service platform 656. In this way, the digital content 668 encourage an entity that possess the item to also maintain possession of the NFT, and this retain an ability to verify authenticity of the item associated with using the NFT.

Turning to FIG. 6B, the service provider system 604 includes a minting system 662, a fingerprint capture system 670, an authentication service system 672, and listing platform 674. The authentication service system 672 is depicted having storage 676 which stores distinguishing feature data 678, which the authentication service system 632 uses to authenticate physical items, including physical items for which digital twinned NFTs are created as discussed above in more detail herein.

It is to be appreciated that the service provider system 604 may include more, fewer, and/or different components than illustrated without departing from the spirit or scope of the described techniques. Additionally, portions or entireties of one or more of the components may be implemented at client devices, such as part of applications at the client devices. For instance, at least a portion of the fingerprint capture system 670 (or the other illustrated components) may be implemented at the client devices as at least part of an application, as a plug-in, via a web page output (e.g., displayed) by the client devices, and so on.

The illustrated blockchain computing environment 600 also includes physical storage vault 680, which may be utilized in one or more implementations, e.g., to store physical items having digital twinned NFTs for safe keeping. The physical storage vault 680 may be included as part of the service provider system 604 or may be controlled by a third party and simply associated with or otherwise accessible to the service provider system 604. Physical items of digital twin NFTs are stored in physical storage vaults. To enable respective users to initiate operations to create NFTs and to perform transactions involving NFTs, the client devices include components to interact within blockchain computing environment 600.

The minting system 662 is configured to "mint" NFTs. Minting an NFT refers to publishing a unique digital asset on a blockchain so that it can be bought, sold, and traded. To mint an NFT, the minting system 662 causes the NFT to be created on the blockchain 116 and programmatically encodes an association of metadata with the NFT. In accordance with the described techniques, for example, the minting system 662 is configured to mint digital twin NFTs of physical items. The metadata for a digital twin NFT may include a fingerprint of the physical item (e.g., a high-resolution image of one or more features of the item, a LIDAR scan of the physical item, a unique serial number engraved on the item, etc.) and digital content of the physical item (e.g., an image of the physical item for presentation, a video of the physical item, and/or a 3D model of the physical item). The metadata may also include other information, such as a digital record of traits of the physical item, a description of the item, a condition of the physical item (which can change over time), an indication that the physical item is an authentic physical item, item authenticity and owner verification records, an indication that the physical item is not an authentic physical item, a physical location where the item was minted (e.g., at a residence, at a location corresponding to a facility of the service provider system, at an event such as a concert or sporting event, and so on), locations of transactions involving the physical item, public addresses of wallets of owners of the NFT, and/or a current location of the physical item, to name just a few. In scenarios where the metadata includes an indication that the physical item is not an authentic physical item, the physical item may be a replica or an imitation of an authentic physical item, examples of which include a print of an original painting or other artwork and a replica jersey, to name just a few. In one or more implementations, information, or portions of the information, encoded into a digital twin NFT may be based on user input to enter the information, e.g., via a user interface of the service provider system 104 in connection with listing the item.

The minting system 662 may encode an association of this metadata with the digital twin NFT by, for example, encoding the actual data (e.g., the unique fingerprint and/or the digital content) in the digital twin NFT, encoding unique identifiers of the actual data in the digital twin NFT, and/or encoding one or more addresses where such data is located (e.g., a storage location) in the digital twin NFT. In operation, the minting system 662 provides data as specified by a token standard associated with the blockchain 616 to one or more of the nodes to mint a new digital twin NFT of a physical item. For example, the minting system 662 packages and communicates the actual metadata to be encoded and/or packages and communicates the association (e.g., identifier and/or addresses) to be encoded according to the token standard to the one or more nodes.

The fingerprint capture system 630 is configured to generate digital fingerprints of physical items that uniquely identify a given physical item from other physical items. The fingerprint capture system 630 generates those fingerprints based on captured features of the physical items, such as features captured using sensors of one or more client devices. As discussed below, the features may be captured using one or more sensors of client devices one or more sensors of the fingerprint capture system 630 (e.g., when configured with hardware to capture the features of physical devices), and/or sensors of other devices. By way of example, the client devices and/or the fingerprint capture system 630 may include a high resolution digital camera to capture high-resolution digital image features of physical items.

The authentication service system 632 is configured to verify whether a physical item corresponds to an authentic physical item. The authentication service system 632 may verify whether a physical item corresponds to an authentic physical item by matching the fingerprint of a physical item, as generated by the fingerprint capture system 630, to distinguishing feature data 638 of a known authentic physical item. The authentication service system 632 may do so by comparing a fingerprint, or captured features encoded in the fingerprint, to portions of the distinguishing feature data 638, e.g., searching the distinguishing feature data 638 for data having at least a threshold similarity to the fingerprint or portions of the fingerprint. The authentication service system 632 may then return a response indicating that a physical item is or is not an authentic physical item (or is unsure whether the physical item is or is not authentic) based on whether the fingerprint matches any of the distinguishing feature data 638.

The listing platform 634 is configured to generate listings for items and to expose those listings (e.g., publish them) to one or more client devices, such as via an online marketplace. For example, the listing platform 634 may generate listings for items for sale and expose those listings to client devices, such that the users of the client devices can interact with the listings via user interfaces to initiate transactions (e.g., purchases, add to wish lists, share, and so on) in relation to the respective item or items of the listings. In accordance with the described techniques, the listing platform 634 is configured to generate listings for physical items or property (e.g., collectibles, luxury items, clothing, electronics, real property, physical computer-readable storage having one or more video games stored thereon, and so on), services (e.g., babysitting, dog walking, house cleaning, and so on), digital items (e.g., digital images, digital music, digital videos) that can be downloaded via the network 610, and NFTs, to name just a few. Notably, the listing platform 634 is configured to generate a combined listing that includes both a physical item and a digital twin NFT of the physical item. The listing platform 634 may generate the combined listing, which lists both the physical item and the digital twin NFT, based on user input received from a client device associated with a user account (e.g., of the listing platform 634) and received via a user interface to generate the combined listing. For example, the service provider system 604 may initiate the minting of a digital twin NFT of a physical item and initiate the listing of both the physical item and the digital twin NFT responsive to receiving such user input via a user interface of an application as output at a client device.

Optionally, the service provider system 604 may store physical items at the physical storage vault 640, such as valuable physical items having digital twin NFTs. Storage of the underlying physical item at the physical storage vault 640 allows ownership of the digital twin NFT and the physical item to be easily transferred between owners without the hassle of physically moving the item to transfer possession, e.g., shipping the item or exchanging it between hands. Instead, the item may be transferred to the physical storage vault 640 for storage and remain in the physical storage vault 640 while ownership of the physical item and/or its digital twin NFT is transferred a number of times. The physical storage vault 640 may also maintain physical items where ownership is divided, using a digital twin NFT, into a number of fractions of ownership of the physical item, e.g., "shares" of the physical item issued according to terms of the digital twin NFT.

Turning to an NFT minting example, the blockchain interaction module 690 and the NFT interaction manager module 692 support interacting with the blockchain system 602 to cause an NFT to be minted. The NFT interaction manager module 692 causes initiation of minting by transmitting an NFT request to a blockchain system to mint the NFT for a blockchain account. A user having a user account obtains a physical item and a digital twin NFT of the physical item, such as by minting the digital twin NFT of the physical item or receiving it through a transfer process. For example, the user may obtain the physical item and digital twin NFT via a listing platform (e.g., listing platform 674), such as an online marketplace. Alternatively or additionally, the listing platform may obtain the physical item and the digital twin NFT of the physical item. Based on ownership of the physical item and the digital twin NFT, the listing platform generates a combined listing for the physical item and the digital twin NFT of the physical item. This may occur, for example, when an owner of the physical item and the digital twin NFT decides to transfer ownership of the physical item and the digital twin NFT to another user, e.g., in exchange for cryptocurrency. A listing platform may expose this combined listing to various client devices. The listing platform may also expose a selectable option to store the physical item in a physical storage vault, e.g., a selectable button or checkbox of a user interface.

Example Distributed Computing System Environment

Figure 7:
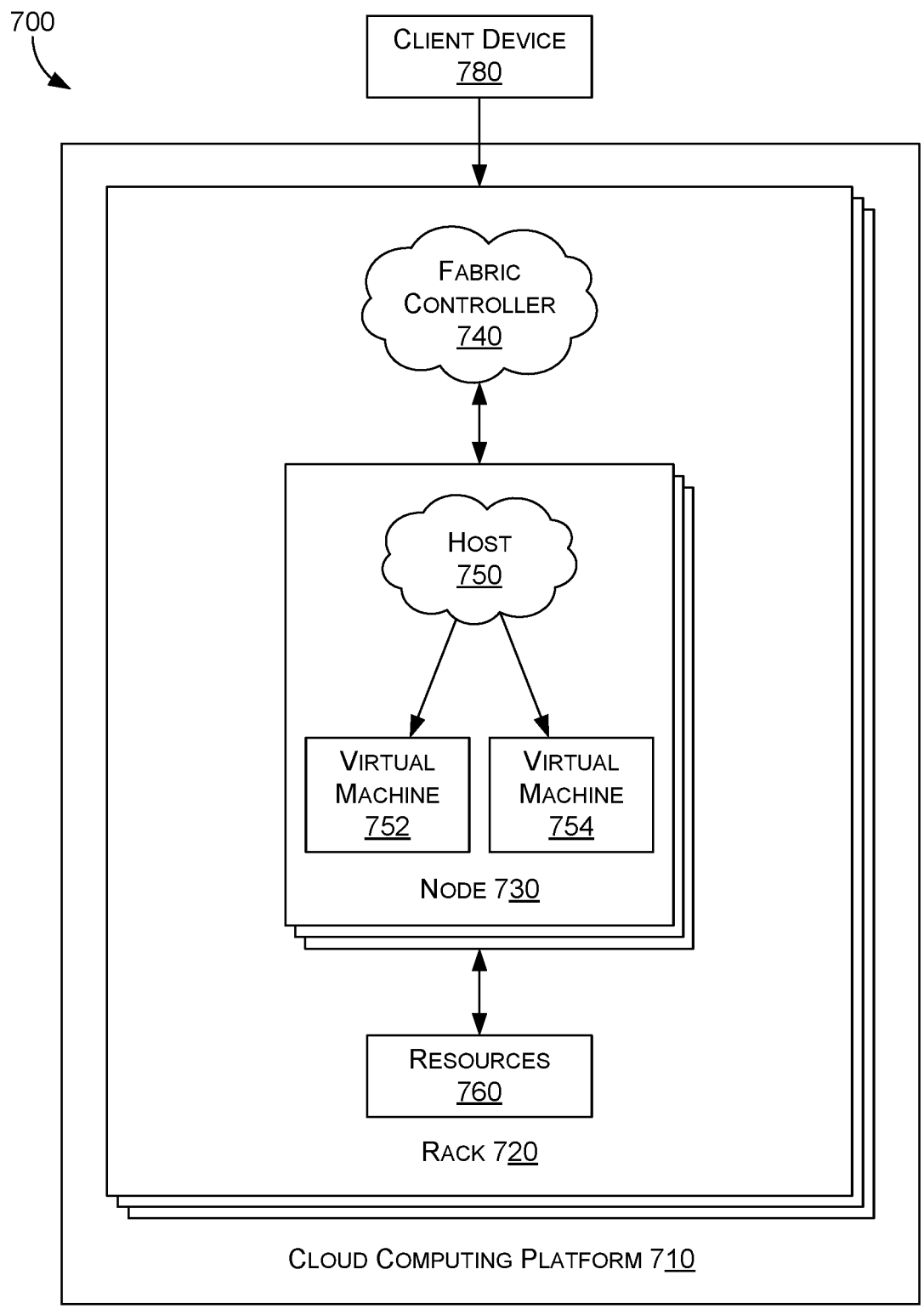
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
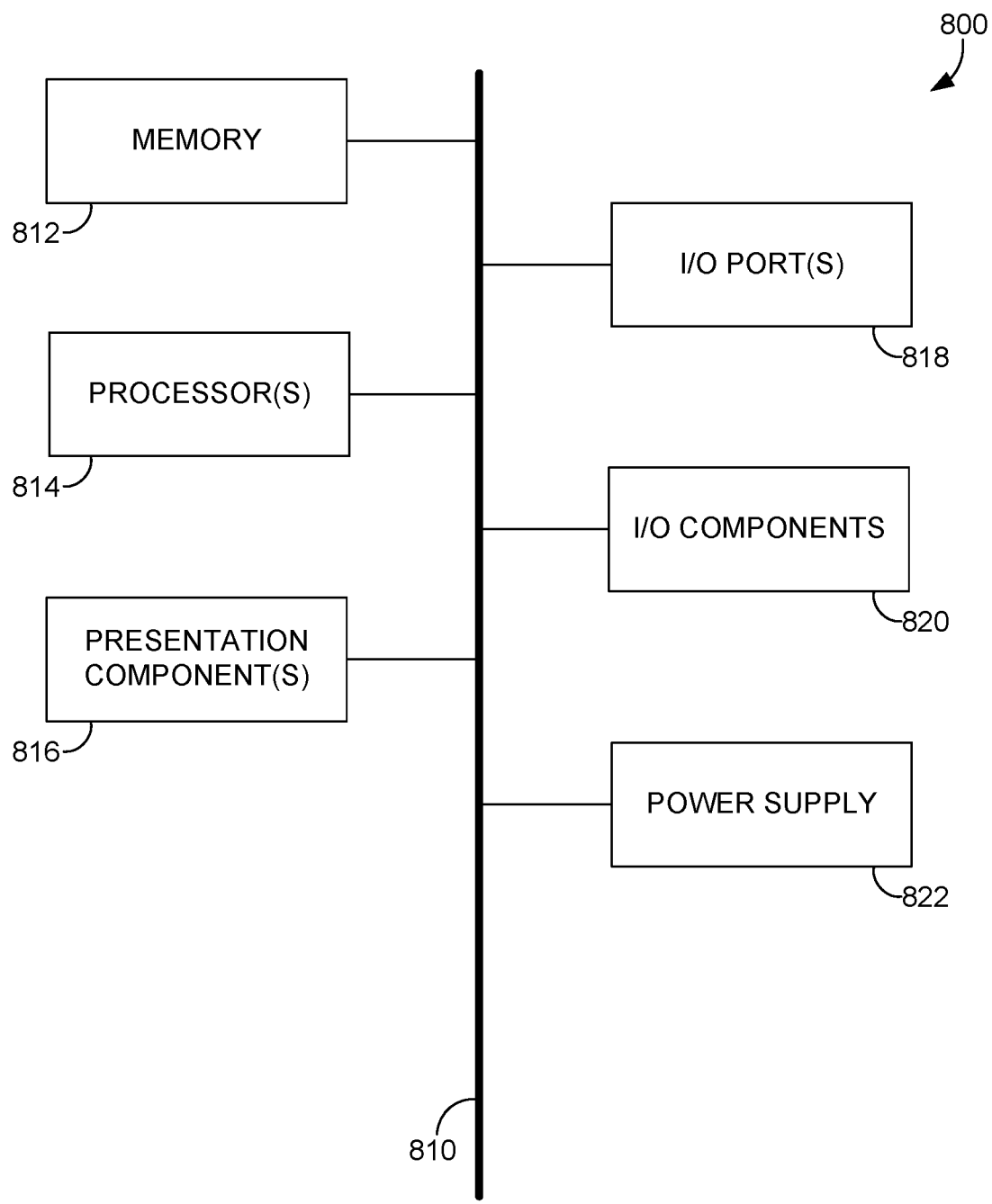
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects herein-above set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
    one or more computer processors; and
    computer memory storing computer-useable instructions that, when used by the one or more computer processors, cause the one or more computer processors to perform operations, the operations comprising:
    accessing a request to execute a watermark-minting operation on a digital asset, wherein the request comprises a set of digital watermarking request attributes;
    based on the set of digital watermarking request attributes, accessing the digital asset and a digital watermark;
    minting, on a blockchain system, the digital asset as a non-fungible token in combination with the digital watermark and a smart contract that controls display of the digital watermark associated with the digital asset; and
    communicating a notification indicating that the watermark-minting operation has been executed for the digital asset.

2. The system of claim 1, wherein the watermark-minting operation further supports causing display of NFT digital assets with digital watermarks or without digital watermarks based on smart contracts that control display of the digital watermarks.

3. The system of claim 1, wherein the set of digital watermarking request attributes identify the digital asset, the digital watermark, and the blockchain system for executing the watermark-minting operation.

4. The system of claim 1, wherein the digital watermark is a system-provided digital watermark or a user-provided digital watermark.

5. The system of claim 1, wherein minting the digital asset comprises communicating one or more digital watermarking request attributes to the blockchain system.

6. The system of claim 1, wherein the smart contract is configured to access one or more digital watermarking request attributes from the blockchain system to control display of the digital watermark associated with the digital asset.

7. The system of claim 1, the operations further comprising:
    accessing a second request to access an NFT digital asset associated with a corresponding digital watermark, wherein the second request comprises a second set of digital watermarking request attributes;
    based on the second set of digital watermarking request attributes, determining the second set of digital watermarking request attributes are associated with the NFT digital asset watermarked with the digital watermark;
    using the second set of digital watermarking request attributes and a corresponding smart contract associated with the NFT digital asset, to cause authorization of display of the NFT digital asset without the corresponding digital watermark;
    based on the authorization, accessing the NFT digital asset without the corresponding digital watermark; and
    causing display of the NFT digital asset without the corresponding digital watermark.

8. The system of claim 7, wherein the smart contract comprises a security mechanism that processes the second set of digital watermarking request attributes to authorize display of the NFT digital asset without the watermark.

9. The system of claim 1, the operations further comprising:
accessing a second request to access an NFT digital asset associated with a corresponding digital watermark, wherein the second request comprises a second set of digital watermarking request attributes;
based on the second set of digital watermarking request attributes, determining the second set of digital watermarking request attributes are associated with the NFT digital asset watermarked with the digital watermark;
using the second set of digital watermarking request attributes and a corresponding smart contract, cause enforcement of display of the NFT digital asset with the corresponding digital watermark; and
based on the enforcement, accessing the NFT digital asset with the corresponding digital watermark; and
causing display of the NFT digital asset with the corresponding digital watermark.

10. The system of claim 9, wherein the smart contract comprises a security mechanism that processes the second set of digital watermarking request attributes to determine not to authorize display of the NFT digital asset without the watermark.

11. One or more computer-storage media having computer-executable instructions embodied thereon that, when executed by a computing system having a processor and memory, cause the processor to perform operations, the operations comprising:
accessing a request to access an NFT digital asset associated with a digital watermark, wherein the request comprises a set of digital watermarking request attributes;
based on the set of digital watermarking request attributes, determining the set of digital watermarking request attributes are associated with the NFT digital asset watermarked with the digital watermark;
using the set of digital watermarking request attributes and a smart contract associated with the NFT digital asset, causing authorization of display of the NFT digital asset without the digital watermark;
based on the authorization, accessing the NFT digital asset without the digital watermark; and
causing display of the NFT digital asset without the digital watermark.

12. The media of claim 11, wherein the set of digital watermarking request attributes identify the digital asset, the digital watermark, and the blockchain system associated with the NFT digital asset.

13. The media of claim 11, further comprising communicating one or more digital watermarking request attributes to the smart contract to support authorizing display of the NFT digital asset without the digital watermark.

14. The media of claim 11, wherein the smart contract is configured to access one or more digital watermarking request attributes to control display of the digital watermark associated with the digital asset.

15. The media of claim 11, wherein the NFT digital asset is caused to be displayed on an interface associated with a seller of the NFT digital asset.

16. A computer-implemented method, the method comprising:
accessing a request to access an NFT digital asset associated with a digital watermark, wherein the request comprises a set of digital watermarking request attributes;
based on the digital watermarking request attributes, determining the set of digital watermarking request attributes are associated with the NFT digital asset watermarked with the digital watermark;
using the set of digital watermarking request attributes and a smart contract, causing enforcement of display of the NFT digital asset with the digital watermark;
based on the enforcement, accessing the NFT digital asset with the digital watermark; and
causing display of the NFT digital asset with the digital watermark.

17. The method of claim 16, wherein the set of digital watermarking request attributes identify the digital asset, the digital watermark, and the blockchain system associated with the NFT digital asset.

18. The method of claim 16, further comprising communicating one or more digital watermarking request attributes to the smart contract to support authorizing display of the NFT digital asset.

19. The method of claim 16, wherein the smart contract comprises a security mechanism that processes the set of digital watermarking request attributes to determine not to authorize display of the NFT digital asset without the watermark.

20. The method of claim 16, wherein the NFT digital asset is caused to be displayed on an interface associated with a buyer of the NFT digital asset.

* * * * *